(12) United States Patent
Wuidart et al.

(10) Patent No.: US 7,046,146 B2
(45) Date of Patent: May 16, 2006

(54) ELECTROMAGNETIC FIELD GENERATION DEVICE FOR A TRANSPONDER

(75) Inventors: Luc Wuidart, Pourrieres (FR); Michel Bardouillet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 605 days.

(21) Appl. No.: 09/859,732

(22) Filed: May 17, 2001

(65) Prior Publication Data

US 2002/0017991 A1 Feb. 14, 2002

(30) Foreign Application Priority Data

May 17, 2000 (FR) .............................. 00 06301

(51) Int. Cl.
*G08B 13/14* (2006.01)

(52) U.S. Cl. ................. 340/572.1; 340/572.7; 340/10.4

(58) Field of Classification Search ............. 340/572.1, 340/572.7, 10.4, 445, 447, 10.41, 10.42; 343/719, 872; 342/42
See application file for complete search history.

(56) References Cited

U.S. PATENT DOCUMENTS

| | | |
|---|---|---|
| 2,411,555 A | 11/1946 | Rogers |
| 3,618,089 A | 11/1971 | Moran, Jr. et al. |
| 4,068,232 A | 1/1978 | Meyers et al. |
| 4,209,783 A | 6/1980 | Ohyama et al. |
| 4,258,348 A | 3/1981 | Belfer et al. |
| 4,278,977 A | 7/1981 | Nossen |
| 4,375,289 A * | 3/1983 | Schmall ............ 340/572 |
| 4,408,185 A | 10/1983 | Rasmussen |
| 4,593,412 A | 6/1986 | Jacob |
| 4,656,472 A | 4/1987 | Walton |
| 4,660,192 A | 4/1987 | Pomatto, Sr. |
| 4,673,932 A | 6/1987 | Ekchian et al. |
| 4,706,050 A | 11/1987 | Andrews |
| 4,782,308 A | 11/1988 | Trobec et al. |
| 4,802,080 A | 1/1989 | Bossi |
| 4,814,595 A | 3/1989 | Gilboa |
| 4,827,266 A | 5/1989 | Sato et al. |
| 4,928,108 A | 5/1990 | Kropielnicki et al. |
| 4,963,887 A | 10/1990 | Kawashima et al. |
| 5,013,898 A | 5/1991 | Glasspool |
| 5,055,853 A | 10/1991 | Garnier |
| 5,084,699 A | 1/1992 | DeMichele |
| 5,099,227 A | 3/1992 | Geiszler et al. |

(Continued)

FOREIGN PATENT DOCUMENTS

| | | |
|---|---|---|
| EP | 0 579 332 A1 | 1/1994 |
| EP | 0 645 840 A | 3/1995 |
| JP | 407245946 A | 9/1995 |
| JP | 10-145267 | 5/1998 |
| JP | 10-203066 | 8/1998 |

OTHER PUBLICATIONS

French Preliminary Search Report from 0006301 filed May 17, 2000.

*Primary Examiner*—Anh V. La
(74) *Attorney, Agent, or Firm*—Lisa K. Jorgenson; James H. Morris; Wolf, Greenfield & Sacks, P.C.

(57) ABSTRACT

A device for generating an electromagnetic field by a first oscillating circuit excited by a high-frequency signal, including, at a distance from the first oscillating circuit, a second passive, unloaded and coreless oscillating circuit, forming an element for concentrating the magnetic flux intended to be intercepted by a transponder by a third oscillating circuit.

45 Claims, 3 Drawing Sheets

U.S. PATENT DOCUMENTS

| | | | |
|---|---|---|---|
| 5,126,749 A | 6/1992 | Kaltner |
| 5,142,292 A | 8/1992 | Chang |
| 5,202,644 A | 4/1993 | Brady |
| 5,214,409 A | 5/1993 | Beigel |
| 5,235,326 A | 8/1993 | Beigel et al. |
| 5,305,008 A | 4/1994 | Turner et al. |
| 5,324,315 A | 6/1994 | Grevious |
| 5,452,344 A | 9/1995 | Larson |
| 5,493,267 A | 2/1996 | Ahlse et al. |
| 5,504,485 A | 4/1996 | Landt et al. |
| 5,519,381 A | 5/1996 | Marsh et al. |
| 5,521,602 A | 5/1996 | Carroll et al. |
| 5,541,604 A | 7/1996 | Meier |
| 5,541,958 A | 7/1996 | Schuermann |
| 5,550,536 A | 8/1996 | Flaxl |
| 5,604,411 A | 2/1997 | Venkitasubrahmanian et al. |
| 5,619,529 A | 4/1997 | Fujioka |
| 5,621,411 A | 4/1997 | Hagl et al. |
| 5,691,605 A | 11/1997 | Xia et al. |
| 5,698,837 A | 12/1997 | Furuta |
| 5,698,838 A | 12/1997 | Yamaguchi |
| 5,701,121 A | 12/1997 | Murdoch |
| 5,703,573 A | 12/1997 | Fujimoto et al. |
| 5,767,503 A | 6/1998 | Gloton |
| 5,801,372 A | 9/1998 | Yamaguchi |
| 5,831,257 A | 11/1998 | Yamaguchi |
| 5,850,416 A | 12/1998 | Myer |
| 5,874,725 A | 2/1999 | Yamaguchi |
| 5,883,582 A | 3/1999 | Bowers et al. |
| 5,889,273 A | 3/1999 | Goto |
| 5,905,444 A | 5/1999 | Zimmer |
| 5,955,950 A | 9/1999 | Gallagher, III et al. |
| 6,014,088 A | 1/2000 | Van Santbrink et al. |
| 6,025,780 A | 2/2000 | Bowers et al. |
| 6,028,503 A | 2/2000 | Preishuberpflugl et al. |
| 6,034,640 A | 3/2000 | Oida et al. |
| 6,070,803 A * | 6/2000 | Stobbe ................ 235/492 |
| 6,070,804 A | 6/2000 | Miyamoto |
| 6,072,383 A | 6/2000 | Gallagher, III et al. |
| 6,075,491 A | 6/2000 | Dakeya et al. |
| 6,100,788 A | 8/2000 | Frary |
| 6,137,411 A | 10/2000 | Tyren |
| 6,150,986 A * | 11/2000 | Sandberg ................ 343/742 |
| 6,154,635 A | 11/2000 | Ohta |
| 6,172,608 B1 | 1/2001 | Cole |
| 6,208,235 B1 | 3/2001 | Trontelj |
| 6,229,443 B1 | 5/2001 | Roesner |
| 6,243,013 B1 | 6/2001 | Duan et al. |
| 6,265,962 B1 | 7/2001 | Black et al. |
| 6,272,320 B1 | 8/2001 | Nandra et al. |
| 6,272,321 B1 | 8/2001 | Bruhnke et al. |
| 6,281,794 B1 | 8/2001 | Duan et al. |
| 6,304,169 B1 | 10/2001 | Blama et al. |
| 6,307,468 B1 | 10/2001 | Ward, Jr. |
| 6,307,517 B1 | 10/2001 | Lee |
| 6,335,665 B1 | 1/2002 | Mendelsohn |
| 6,356,738 B1 | 3/2002 | Schneider et al. |
| 6,393,045 B1 | 5/2002 | Belcher et al. |
| 6,424,820 B1 | 7/2002 | Burdick et al. |
| 6,441,804 B1 | 8/2002 | Hsien |
| 6,446,049 B1 | 9/2002 | Janning et al. |
| 6,491,230 B1 | 12/2002 | Dubost et al. |
| 6,498,923 B1 | 12/2002 | Ikefuji et al. |
| 6,617,962 B1 | 9/2003 | Horwitz et al. |
| 6,646,543 B1 | 11/2003 | Mardinian et al. |
| 6,650,226 B1 | 11/2003 | Wuidart et al. |
| 6,650,227 B1 | 11/2003 | Bradin |
| 6,650,229 B1 | 11/2003 | Wuidart et al. |
| 6,654,466 B1 | 11/2003 | Ikefuji et al. |
| 6,690,229 B1 | 2/2004 | Rudolph |
| 6,703,921 B1 | 3/2004 | Wuidart et al. |
| 2002/0008611 A1 | 1/2002 | Wuidart |
| 2003/0227323 A1 | 12/2003 | Enguent |

* cited by examiner

ELECTROMAGNETIC FIELD GENERATION DEVICE FOR A TRANSPONDER

BACKGROUND OF THE INVENTION

1. Field of the Invention

The present invention relates to systems using electromagnetic transponders, that is, transmitters and/or receivers (generally mobile) capable of being interrogated in a contactless and wireless manner by a unit (generally fixed), called a read and/or write terminal. Generally, transponders extract the power supply required by the electronic circuits included therein from the high-frequency field radiated by an antenna of the read and write terminal. The present invention applies to such systems, be they read-only systems, that is, including a terminal only reading the data from one or several transponders, or read/write systems, in which the transponders contain data that can be modified by the terminal.

2. Discussion of the Related Art

Systems using electromagnetic transponders are based on the use of oscillating circuits including a winding forming an antenna, on the transponder side and on the read/write terminal side. These circuits are intended to be coupled by a close magnetic field when the transponder enters the field of the read/write terminal.

Figure 1:
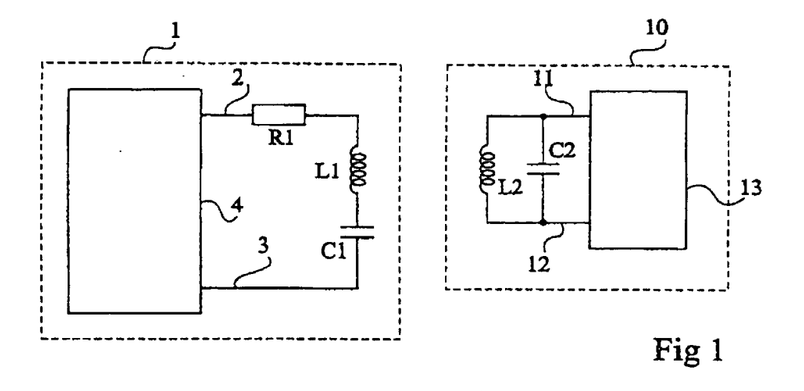
FIG. 1, previously described, very schematically shows an electric diagram of a conventional transponder system.

FIG. 1 very schematically shows a conventional example of a data exchange system of the type to which the present invention relates between a read/write terminal 1 and a transponder 10 of the type to which the present invention applies.

Generally, terminal 1 is essentially formed of a series oscillating circuit formed of an inductance L1 in series with a capacitor C1 and a resistor R1, between an output terminal 2 of an amplifier or antenna coupler (not shown) and a reference terminal 3 (generally, the ground). The antenna coupler belongs to a circuit 4 for controlling the oscillating circuit and exploiting received data including, among others, a modulator/demodulator and a microprocessor for processing the control signals and the data. The exploitation of the received data is based on a measurement of the current in the oscillating circuit or of the voltage thereacross. Circuit 4 of the terminal generally communicates with different input/output circuits (keyboard, screen, means of exchange with a server, etc.) and/or processing circuits, not shown. The circuits of the read/write terminal generally draw the power necessary for their operation from a supply circuit (not shown) connected, for example, to the electric supply system or to batteries.

A transponder 10, intended to cooperate with a terminal 1, essentially includes a parallel oscillating circuit formed of an inductance L2, in parallel with a capacitor C2 between two input terminals 11, 12 of control and processing circuits 13. Terminals 11, 12 are in practice connected to the input of a rectifying means (not shown), outputs of which form D.C. supply terminals of the circuits internal to the transponder. These circuits generally include, essentially, a microprocessor capable of communicating with other elements (for example, a memory), a demodulator of the signals received from terminal 1, and a modulator for transmitting information to the terminal.

The oscillating circuits of the terminal and of the transponder are generally tuned on the same frequency corresponding to the frequency of an excitation signal of the terminal's oscillating circuit. This high-frequency signal (for example, at 13.56 MHz) is not only used as a transmission carrier but also as a remote supply carrier for the transponder(s) located in the terminal's field. When a transponder 10 is located in the field of a terminal 1, a high-frequency voltage is generated across terminals 11 and 12 of its resonant circuit. This voltage, after being rectified and possibly clipped, is intended for providing the supply voltage of electronic circuits 13 of the transponder. For clarity, the rectifying, clipping, and supply means have not been shown in FIG. 1. In return, the data transmission from the transponder to a terminal is generally performed by modulating the load formed by resonant circuit L2, C2. The load variation is performed at the rate of a so-called back-modulation sub-carrier, of a frequency (for example, 847.5 kHz) smaller than that of the carrier.

The antennas of terminal 1 and of transponder 10 are, in FIG. 1, illustrated by their equivalent electric diagrams, that is, inductances (neglecting the series resistances). In practice, a terminal 1 has a flat antenna L1 formed of a few circular spirals (most often one or two spirals) of relatively large diameter (for example, of a given value ranging between one and 4 inches) and antenna L2 of a transponder (for example, a card of credit card format) is formed of a few rectangular spirals (most often from two to five spirals) inscribed within a relatively small diameter (spirals with a side from 2 to 3 inches) as compared to the diameter of antenna L1.

Figure 2:
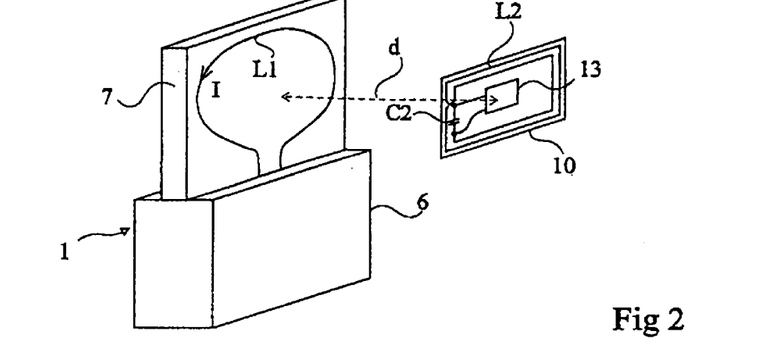
FIG. 2, previously described, shows an example of shapes of antennas of a conventional transponder system.

FIG. 2 is a simplified perspective view of a terminal and of a transponder illustrating a conventional example of antennas. Electronic circuits 4 of terminal 1, as well as capacitor C1 and resistor R1, are generally contained in base 6. Antenna L1 is, for example, supported by a printed circuit wafer 7 protruding from base 6. In FIG. 2, it is assumed that antenna L1 is formed of a single spiral carrying, when the terminal's oscillating circuit is excited by the high-frequency signal, a current I. The indicated direction of current I is arbitrary and this current is alternating. Transponder 10 is assumed to be a smart card integrating circuits 13 and antenna L2 of which includes two rectangular coplanar spirals approximately describing the periphery of card 10. Capacitor C2 shown as separated from circuits 13 is generally formed by being integrated to the chip.

Conventional transponder systems generally have a limited range, that is, at a certain distance (d, FIG. 2) from the terminal, the magnetic field is insufficient to properly remotely supply a transponder. The minimum field generally ranges between 0.1 and 1 A/m according to the transponder's consumption, which essentially differs according to whether it is or not provided with a microprocessor.

The remote supply range depends on the amount of magnetic flux emitted by the terminal or reader, which can be "intercepted" by a transponder. This amount directly depends on the coupling factor between antennas L1 and L2, which represents the flux proportion received by the transponder. The coupling factor (between 0 and 1) depends on several factors, among which, essentially, the mutual inductance between antennas L1 and L2 and the respective size of the antennas, and the tuning of the oscillating circuits on the high-frequency carrier frequency. For given sizes and a given mutual inductance, the coupling is maximum when the oscillating circuits of the terminal and of the transponder are both tuned on the frequency of the remote supply carrier.

Figure 3:
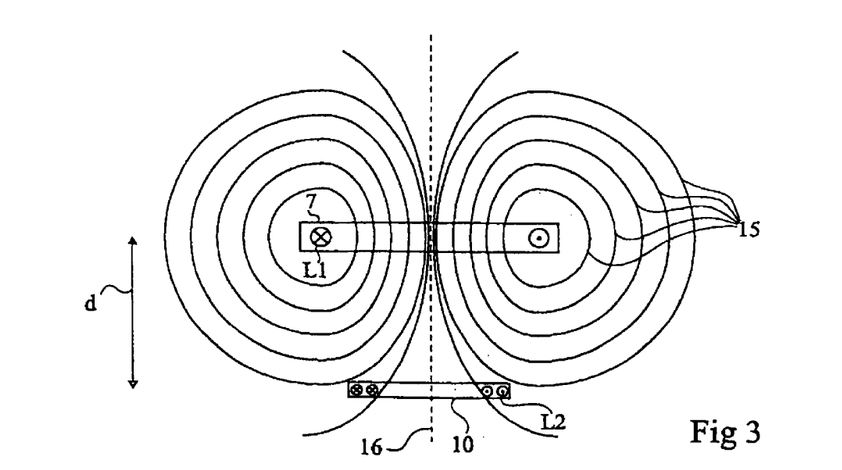
FIG. 3, previously described, shows the course of the magnetic field lines in the conventional system of FIG. 2.

FIG. 3 schematically shows a conventional example of distribution of the magnetic field lines generated by a terminal 1 in the field of which a transponder 10 is present. The representation of FIG. 3 corresponds, for example, to a cross-section of the representation of FIG. 2 including both antennas L1 and L2. In FIG. 3, an arbitrary flowing direction of current I in inductances L1 and L2 has been indicated. Since the current is alternating, this is, for example, its direction at a given time. Magnetic field lines 15 wind around the conductor forming antenna L1 and are, in the cross-section view of FIG. 3, symmetrical with respect to an axis 16 of symmetry of antenna L1. As illustrated by this drawing, transponder 10 receives power when its antenna L2 is located in the terminal's field.

A conventional solution to increase the range consists of increasing the size of antenna L1 of the terminal. To keep the magnetic field, the intensity of the current of the excitation signal must then be proportionally increased. A first disadvantage of such a solution is that it increases the necessary system excitation power. A second disadvantage of such a solution is that such a current increase remains limited by the generator structure and requires a significant sizing of the components (in particular, a large cross-section of the conductor forming antenna L1). Further, the losses are proportional to the square of the current.

To attempt overcoming this disadvantage, a known solution is to use, for relatively large antennas (for example, of portico type), a parallel oscillating circuit on the terminal side. This circuit is then voltage-driven and no longer current-driven, which results in a greater increase of the current in the antenna (assembled as a so-called "rejector" circuit) without requiring that this current flows through the generator. Such a solution has the advantage of limiting losses. However, this solution still causes an increase in the power consumption (due to the voltage increase to increase the power). Further, the maximum field at the center of antenna L1 is generally set by standards.

U.S. Pat. No. 4,802,080 discloses an energy transfer circuit with two windings sharing a same magnetic core, that are mechanically and electrically connected, and that are close to each other.

SUMMARY OF THE INVENTION

The present invention aims at overcoming the disadvantages of conventional transponder systems.

The present invention aims, in particular, at improving the range and/or the signal level available at a given distance, from a read and/or write transponder terminal.

The present invention also aims at providing a solution which is compatible with existing systems. More precisely, the present invention aims at providing a solution that requires no modification of the transponders and, preferably, no modification of the read/write terminal.

The present invention further aims at providing a low power consumption solution, requiring no specific power supply.

To achieve these and other objects, the present invention provides an antenna for generating an electromagnetic field by a first oscillating circuit excited by a high-frequency signal, including, at a distance from the first oscillating circuit, a second passive and unloaded and coreless oscillating circuit, forming an element for concentrating the magnetic flux intended to be intercepted by a transponder by a third oscillating circuit.

According to an embodiment of the present invention, the second oscillating circuit and the first oscillating circuit have approximately identical natural resonance frequencies chosen, preferably, to approximately correspond to the frequency of the excitation signal of the first oscillating circuit.

According to an embodiment of the present invention, the second oscillating circuit includes at least one planar inductance, the general surface area of which is inscribed in a surface area greater than that in which is inscribed an inductance included in the third oscillating circuit of a transponder intended for receiving the magnetic flux.

According to an embodiment of the present invention, the second oscillating circuit includes at least one planar inductance, the general surface area of which is inscribed in a surface area greater than or equal to that in which is inscribed an inductance included in the first oscillating circuit.

According to an embodiment of the present invention, the orientation of the planes in which are inscribed planar inductances of the first and second oscillating circuits is chosen according to desired privileged operating areas.

According to an embodiment of the present invention, the concentrator includes at least two voltage or current sampling terminals.

The present invention also provides a magnetic flux concentrator adapted to cooperating with an element for generating an electromagnetic field, this concentrator being formed of an oscillating circuit provided with a single inductance in parallel with a capacitor.

According to an embodiment of the present invention, the concentrator is formed of n oscillating circuits with coplanar inductances.

According to an embodiment of the present invention, the concentrator includes n coplanar inductances, in parallel with a single capacitor.

The present invention also provides a system of information exchange between an electromagnetic transponder and a read and/or write terminal.

The foregoing objects, features and advantages of the present invention, will be discussed in detail in the following non-limiting description of specific embodiments in connection with the accompanying drawings.

DETAILED DESCRIPTION

The same elements have been referred to with the same references in the different drawings. For clarity, the figures have been drawn out of scale and only those elements of a terminal and of a transponder which are necessary to the understanding of the present invention have been illustrated in the drawings and will be described hereafter. In particular, the circuits for processing and exploiting the exchanged data have not been detailed since they are conventional. These will most often be dedicated or programmable digital circuits. Further, the present invention applies whatever the type of transponder (card of credit card type, electronic label, etc.), be it or not provided with a microprocessor.

A feature of the present invention is to provide, in association with a first electromagnetic field generation circuit, at least one second passive unloaded oscillating circuit for deforming the field lines of the first circuit. This second oscillating circuit is a parallel (rejector) circuit that supplies no load and receives no electric excitation signal.

Another feature of the present invention is that this resonant circuit according to the present invention is tuned on the frequency of the excitation carrier of the first oscillating circuit. Thus, according to the present invention, what will be called hereafter a flux concentrator associated with the terminal is provided. This flux concentrator includes at least one planar antenna having, preferably, a size such that it is inscribed in a surface area greater than or equal to that in which antenna L1 of the terminal is inscribed. According to the invention, the antennas have no magnetic core for transmitting the magnetic flux so that they can be arranged at a distance from each other.

Figure 4:
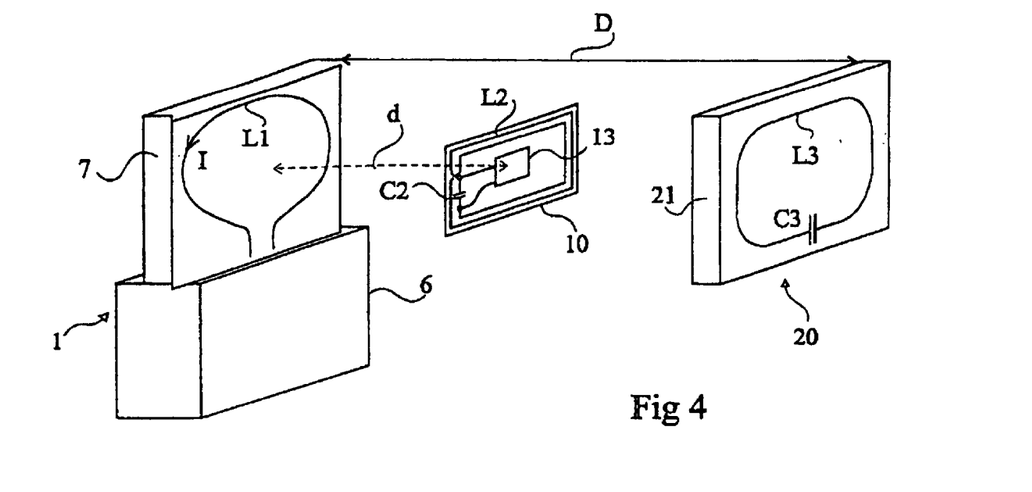
FIG. 4 very schematically shows a first embodiment of a device for generating an electromagnetic field according to the present invention.

FIG. 4 very schematically shows a first embodiment of the present invention. The representation of FIG. 4 is to be compared with that of FIG. 2 described previously. It shows a read and/or write terminal 1 intended for cooperating, by close electromagnetic coupling, with one or several electromagnetic transponders 10.

In the embodiment of FIG. 4, terminal 1 and transponder 10 have conventional structures such as described in relation with FIG. 2.

According to the present invention, the electromagnetic field generation device includes not only terminal 1 provided with field generation oscillating circuit L1-C1, but also at least one element 20 for concentrating the electromagnetic field. This element 20 forms a passive resonant circuit which is unloaded and not electrically activated, here formed of an inductance L3 having its two terminals connected to the respective electrodes of a capacitor C3. In practice, inductance L3 may be formed, as inductance L1, on a printed circuit wafer 21. The oscillating circuit of flux concentrator 20 preferably is tuned to the same frequency as the oscillating circuit of terminal 1. In other words, for a given pulse ω of the remote supply carrier, components L3, C3 will be chosen so that $1/(L3*C3)=\omega^2$. It should be noted that, to maximize the remote supply, the oscillating circuit of transponder 10 conventionally is also tuned to the remote supply carrier. Thus, $1/(L1*C1)=1/(L2*C2)=1/(L3*C3)=\omega^2$.

Such a concentrator will be placed in the field of the terminal's antenna so that this concentrator receives enough field to maintain its own resonance. This results in locally creating (around the concentrator) a field additional to that of the sole terminal. However, the concentrator is positioned at a distance from the terminal and thus from the first oscillating circuit with which it preferentially does not share a connection.

The orientation of the plane in which the concentrator's antenna is inscribed with respect to the plane of the terminal's antenna can be used to favor an operation in an axis different from the perpendicular to the plane of the terminal's antenna, or in a localized area where the field lines are concentrated.

Figure 5:
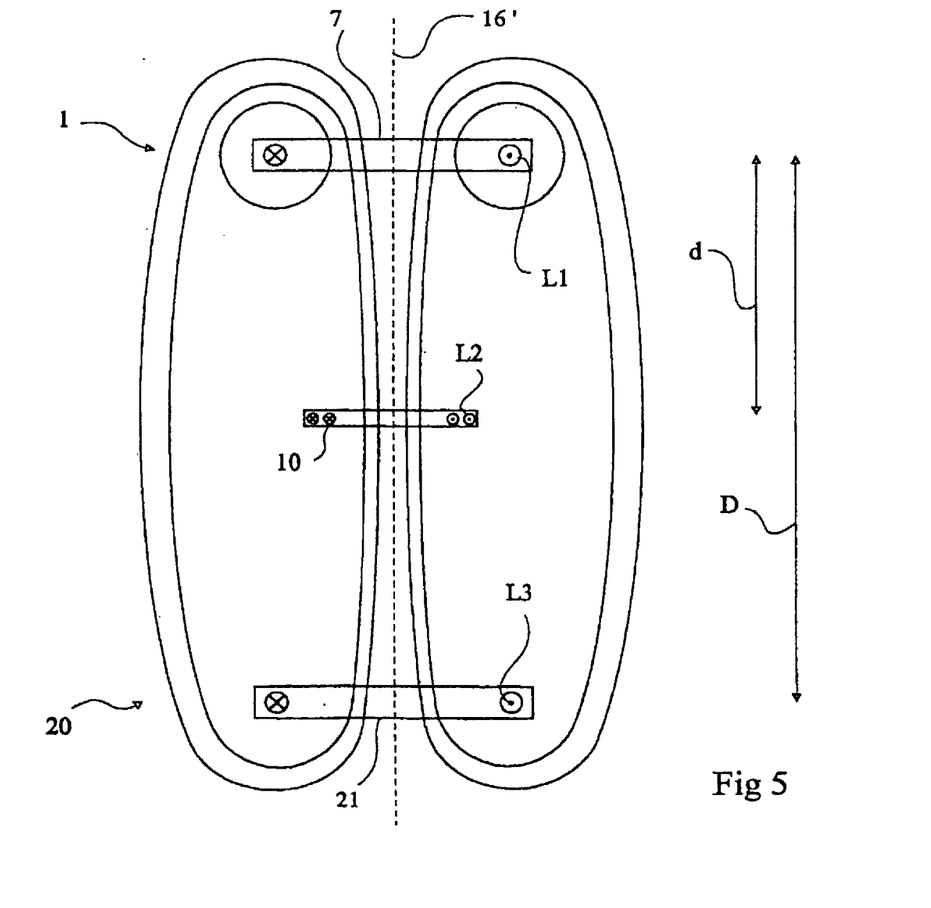
FIG. 5 very schematically shows the courses of the magnetic field lines generated by the device of FIG. 4.

FIG. 5 illustrates this phenomenon by showing a simplified cross-section view of the device of FIG. 4 illustrating the course of the field lines. The representation of FIG. 5 is to be compared with that of previously-described FIG. 3. It can be seen that, due to the flux concentrator's oscillating circuit, the field lines stretch in its direction, at least some of them winding around its antenna conductor. As a result, a transponder 10 can be placed anywhere between terminal 1 and concentrator 20 while being able to receive a sufficient power for its supply. It should be noted that, in an extreme case, a transponder can be remotely supplied by being placed on the other side, but close to the concentrator with respect to the terminal.

According to the present invention, distance D separating concentrator 20 from terminal 1 is chosen according to the sizes and geometries of antennas L1 and L3. Indeed, there exists a maximum distance D between the terminal and the concentrator beyond which the latter will be ineffective. This maximum distance corresponds to a limiting distance for which, when a transponder is placed between the terminal and the concentrator, this transponder remains remotely supplied with no discontinuity whatever its position between the terminal and the concentrator.

An advantage of the present invention is that the system range increase is obtained with no additional power consumption. Indeed, the sole power consumption of the flux concentrator corresponds to the dissipation of its components L3 and C3 which are only slightly resistive. For a given current I of excitation of the terminal's oscillating circuit, the range of a system, equipped with a concentrator having an antenna with a size corresponding to that of antenna L1, is approximately doubled with respect to that of a conventional terminal excited by a same current.

Another advantage of the present invention is that its implementation requires no modification of the terminal or of the transponder. Specifically, in view of the absence of a magnetic core to concentrate the magnetic flux, the terminal and the flux concentrator are mechanically independent from each other. It is enough to place a properly sized flux concentrator opposite to a terminal at an adequate distance to obtain an increase of the system range.

Figure 6:
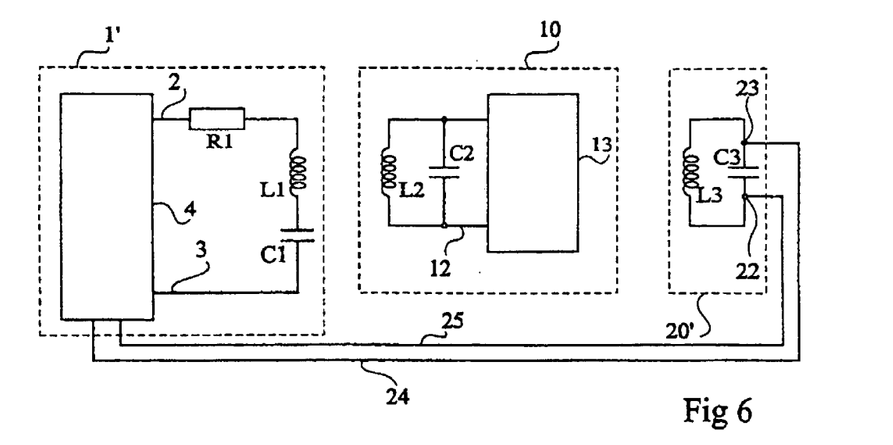
FIG. 6 shows a simplified schematic electric diagram of a device for generating an electromagnetic field according to a second embodiment of the present invention.

FIG. 6 show in a simplified manner the equivalent electric diagram of an electromagnetic field generation device at a distance from a transponder according to a second embodiment of the present invention. The representation of FIG. 6 is to be compared with that of previously-described FIG. 1.

A feature of this second embodiment is that the oscillating circuit of flux concentrator 20' is also used as an element for detecting possible data transmitted by transponder 10. As previously indicated, the transmission of data from the transponder to the reader is performed by modulating, at the rate of a sub-carrier, the load formed by the transponder on the terminal's oscillating circuit. In a device with a flux concentrator of the present invention, this load variation may be detected on the terminal side as well as on the concentrator side. It can thus be provided to sample a signal across capacitor C3. Terminals 22 and 23 can thus be connected (connections 24 and 25) to circuit 4 of exploitation of the data of terminal 1' (for example, across the input terminals of a demodulator). It will however be ascertained that this measure can be considered as not affecting the unloaded character of the concentrator's resonant circuit.

According to the present invention, the antenna of the flux concentrator's oscillating circuit is inscribed, preferably, in a surface area greater than or equal to the surface area in which the terminal's antenna is inscribed and, preferably, substantially the same surface area.

It should however be noted that it is possible to provide an antenna L3 of general size smaller than antenna L1, provided that it is greater than the antenna L2 of a transponder for which the system is intended. A field cone converging to the concentrator is then obtained, which already increases the range with respect to a conventional system.

According to the first and second embodiments illustrated in FIGS. 4 and 6, the condition of approximately identical bulk of antennas L1 and L3 is respected by providing an antenna L3 having substantially the same shape and size as antenna L1 of terminal 1 or 1'.

Figure 7A:
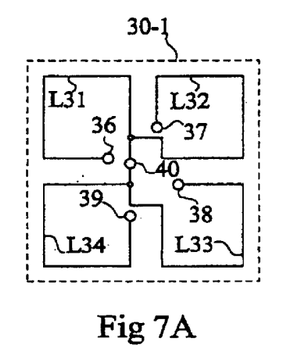
FIG. 7A shows, as seen from a first surface, a flux concentrator of a device according to a third embodiment of the present invention.
Figure 7B:
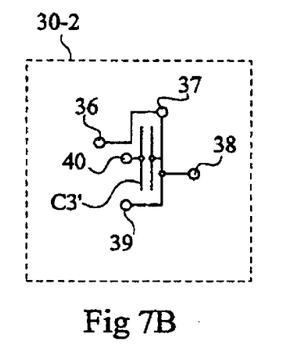
FIG. 7B shows, as seen from a second surface, the flux concentrator of FIG. 7A.
Figure 7C:
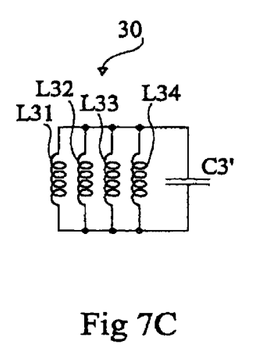
FIG. 7C shows an equivalent electric diagram of the flux concentrator of FIGS. 7A and 7B.

FIGS. 7A, 7B, and 7C illustrate a third embodiment of the present invention in which the size condition indicated hereabove is respected by providing, on the side of concentrator 30, a network of several inductances associated in parallel, at most each to one capacitor. Preferably, a single capacitor is provided for all the inductances in the network (four inductances having substantially the same size and the same value in the example of FIGS. 7A to 7C). FIG. 7A is a view as seen from a first surface 30-1 of a printed circuit wafer on which are, for example, formed inductances L31 to L34. FIG. 7B is a view from second surface 30-2 of the printed circuit wafer. FIG. 7C shows the equivalent electric diagram of concentrator 30 according to this third embodiment.

Inductances L31 to L34 are associated in parallel with capacitor C3'. As illustrated in FIG. 7A, the four inductances are connected by a first end on first surface 30-1 while their other ends are connected to vias 36, 37, 38, and 39 of connection to the second surface. On the side of second surface 30-2, the vias of the second ends are connected together to a first electrode of capacitor C3', the second electrode of which is connected, for example by a common via 40, to the first ends of the inductances. Other schemes may of course be envisaged for associating the inductances in parallel on capacitor C3'. For example, if capacitor C3' is formed across the thickness of the printed circuit, a single via can suffice.

It should be noted that the association of the inductances in networks of antennas must be such that all the cells in the network generate fields, the lines of which add to one another (all are in the same direction).

An advantage of the third embodiment is that by providing several overlapping oscillating circuits, all tuned on the remote supply carrier frequency, the field lines are more homogeneous between the terminal and the concentrator, whereby the power received by the transponder in the field is also more homogeneous for different lateral shifting positions with respect to the axis of symmetry (16', FIG. 5) of the system.

Another advantage of the third embodiment of the present invention is that it enables, in a parallel network association of the concentrator inductances and for a given resulting inductance value L3, increasing the value of the capacitor C3' to be used. Indeed, relation $1/(L3*C3')=\omega^2$ must be respected. Assuming that inductances L31, L32, L33, and L34 all have the same values, this results in the above example in that capacitor C3' must have a value of 4*C3. An advantage is that the feasibility of the concentrator is guaranteed. Indeed, due to the high frequencies (several tens of MHz) of the carriers and to the (geometric) size of the required inductance, the value of the capacitance can become smaller than the stray capacitance of the inductance, making its formation impossible. By decreasing the size of the individual antennas, the forming of the concentrator is facilitated by allowing the use of one or several capacitors of greater capacitance, and thus more easily greater than the respective stray capacitances of the antennas.

Another advantage is that by decreasing the value of the equivalent inductance, the overvoltage developed thereacross and, accordingly, the parasitic electric field resulting therefrom, are decreased.

The use of a network of antennas finds an interest especially (but not exclusively) in portico type systems where respecting the general size condition with respect to antenna L1 of the terminal results in a capacitor C3 that is too small.

It should be noted that, as an alternative, the capacitor may be formed of several oscillating circuits independent from one another, the respective inductances of which are also decreased with respect to the case of a single antenna and the respective capacitors associated with each inductance of which can thus also be greater than with a single inductance having the same general size. Indeed, each oscillating circuit must fulfil the condition of tuning to the remote supply frequency.

Figure 8:
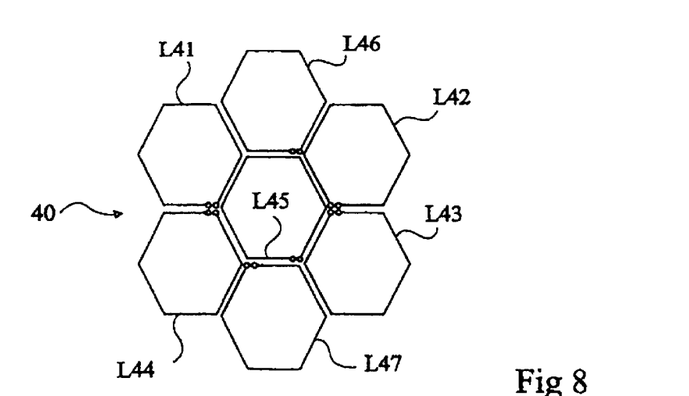
FIG. 8 shows an alternative of the third embodiment of a flux concentrator according to the present invention.

FIG. 8 schematically shows a front view of antenna 40 of a concentrator according to another alternative of the third embodiment of the present invention. Each individual inductance L41, L42, L43, L44, L45, L46 and L47 has the shape of a hexagon to obtain a honeycomb structure with, for example, seven cells. Such a structure optimizes the homogeneity of field lines. For simplification, the interconnections of the inductances with the capacitor(s) have not been shown. These interconnections can be deduced from the discussion of the preceding drawings.

It should be noted that a network association of several oscillating circuits such as illustrated in FIGS. 7 and 8 may also be performed by associating the inductances in series. In particular, the advantage of homogenizing the field lines is independent from the type of association (parallel or series) of the concentrator inductances.

Of course, the present invention is likely to have various alterations, modifications, and improvements which will readily occur to those skilled in the art. In particular, the sizing of the inductances will be chosen according to the application and, in particular, to the oscillating circuit of the terminal for which the concentrator is intended. For example, after having determined the size of the antenna(s) and the value of the capacitance, the number of spirals of the antennas is determined according to the inductances desired to respect the tuning. Further, the choice of the geometry (circular, rectangular, etc.) of the antennas may depend on factors (for example, the place of implantation, the terminal shape, etc.) other than those of the present invention. Further, it should be noted that the implementation of the present invention does not exclude slightly increasing the excitation power of the terminal's oscillating circuit. Such an increase may be used, for example, to compensate for resistive losses within the concentrator to obtain, by means of an antenna of identical general size, an effective doubling of the range. Also, those skilled in the art will understand that the distance between the oscillating circuits, i.e. between the antennas, depends in particular upon the application and upon the number, the sizes and the values of the inductors and capacitors of the oscillating circuits. This distance is preferentially greater than zero, i.e. a distance corresponding to a mechanical contact between the windings, and smaller than the limit distance for which a transponder remains telesupplied whatever be its position between the terminal and the concentrator. For example, the distance D is comprised between 10 cm and 1 m.

Among the applications of the present invention are contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for generating an electromagnetic field of a first oscillating circuit excited by a high-frequency signal, including, at a distance from the first oscillating circuit, a second passive, unloaded and coreless oscillating circuit, forming an element for concentrating a magnetic flux of the electromagnetic field intended to be received by a transponder having a third oscillating circuit,
   wherein the second oscillating circuit includes a plurality of coplanar inductances.

2. The device of claim 1, wherein the second oscillating circuit and the first oscillating circuit have approximately identical natural resonance frequencies chosen to approximately correspond to a frequency of an excitation signal of the first oscillating circuit.

3. The device of claim 1, wherein a general surface area of the plurality of coplanar inductances is inscribed in a surface area greater than a surface area in which is inscribed an inductance included in the third oscillating circuit of a transponder intended for receiving the magnetic flux.

4. The device of claim 1, wherein a general surface area of the plurality of coplanar inductances is inscribed in a surface area greater than or equal to a surface area in which is inscribed an inductance included in the first oscillating circuit.

5. The device of claim 4, wherein the planar inductances of the first and second oscillating circuits are inscribed in planes, and wherein an orientation of the planes is chosen according to desired privileged operating areas.

6. The device of claim 1, wherein the concentrating element includes at least two voltage or current sampling terminals.

7. The device of claim 1, wherein the concentrating element is adapted to cooperate with an element for generating the electromagnetic field, and includes a plurality of oscillating circuits that include the plurality of coplanar inductances.

8. The device of claim 1, wherein the concentrating element is adapted to cooperate with an element for generating the electromagnetic field, and includes a capacitor in parallel with the plurality of coplanar inductances.

9. The device of claim 1, wherein the first oscillating circuit is part of a read/write terminal operative to exchange information with the transponder.

10. The device of claim 7, wherein the concentrating element includes a plurality of oscillating circuits that include the plurality of coplanar inductances.

11. The device of claim 8, wherein the concentrating element includes a capacitor in parallel with the plurality of coplanar inductances.

12. The device of claim 6, wherein the two voltage or current sampling terminals of the concentrating element are operative to detect data transmitted by the transponder.

13. The device of claim 12, wherein the two voltage or current sampling terminals of the concentrating element are operatively coupled to the first oscillating circuit.

14. The device of claim 12, wherein the concentrating element is operative to provide the detected data to the first oscillating circuit.

15. A system for electromagnetically influencing a transponder, comprising:
   a first oscillating circuit, spaced from the transponder, to generate an electromagnetic field; and
   a magnetic flux concentrator, spaced from the first oscillating circuit, to concentrate a magnetic flux of the electromagnetic field for reception by the transponder, wherein the magnetic flux concentrator includes a plurality of coplanar inductances.

16. The system of claim 15, wherein the magnetic flux concentrator includes a passive oscillating circuit.

17. The system of claim 15, wherein the magnetic flux concentrator includes an unloaded oscillating circuit.

18. The system of claim 15, wherein the magnetic flux concentrator includes a coreless oscillating circuit.

19. The system of claim 15, wherein the magnetic flux concentrator is spaced from the transponder.

20. the system of claim 15, wherein the magnetic flux concentrator includes one or more oscillating circuits that include the plurality of coplanar inductances.

21. The system of claim 15, wherein the magnetic flux concentrator includes a capacitor in parallel with the plurality of coplanar inductances.

22. The system of claim 15, wherein the magnetic flux concentrator is operative to detect data transmitted by the transponder.

23. The system of claim 22, wherein the magnetic flux concentrator includes two voltage or current sampling terminals to detect the transmitted data, wherein the two voltage or current sampling terminals are operatively coupled to the first oscillating circuit.

24. The system of claim 22, wherein the magnetic flux concentrator is operative to provide the detected data to the first oscillating circuit.

25. The system of claim 15, wherein the first oscillating circuit includes at least a first planar inductance inscribed in a first surface area, and wherein the plurality of coplanar inductances of the magnetic flux concentrator are inscribed in a second surface area, and wherein the first surface area is substantially smaller than the second surface area.

26. The system of claim 15, wherein the transponder includes at least a first planar inductance inscribed in a first surface area, and the plurality of coplanar inductances of the magnetic flux concentrator are inscribed in a second surface area, and wherein the second surface area is substantially larger than the first surface area.

27. The system of claim 15, wherein the first oscillating circuit is adapted to receive an excitation signal having a first frequency, and has a first resonance frequency, and wherein the magnetic flux concentrator includes a second oscillating circuit having the first resonant frequency.

28. The system of claim 15, wherein the first resonant frequency is substantially equal to the first frequency.

29. The system of claim 15, wherein the first oscillating circuit is part of a read/write terminal operative to exchange information with the transponder.

30. A system for electromagnetically influencing a transponder, comprising:
   a first oscillating circuit, spaced from the transponder, to generate an electromagnetic field; and
   a magnetic flux concentrator, spaced from the first oscillating circuit, to concentrate a magnetic flux of the electromagnetic field for reception by the transponder, and to detect data transmitted by the transponder.

31. The system of claim 30, wherein the magnetic flux concentrator includes means for detecting data transmitted by the transponder.

32. The system of claim 30, wherein the magnetic flux concentrator includes a passive oscillating circuit.

33. The system of claim 30, wherein the magnetic flux concentrator includes an unloaded oscillating circuit.

34. The system of claim 30, wherein the magnetic flux concentrator includes a coreless oscillating circuit.

35. The system of claim 30, wherein the magnetic flux concentrator is spaced from the transponder.

36. The system of claim 30, wherein the magnetic flux concentrator includes a plurality of coplanar inductances.

37. The system of claim 36, wherein the magnetic flux concentrator includes one or more oscillating circuits that include the plurality of coplanar inductances.

38. The system of claim 36, wherein the magnetic flux concentrator includes a capacitor in parallel with the plurality of coplanar inductances.

39. The system of claim 30, wherein the magnetic flux concentrator includes two voltage or current sampling terminals to detect the transmitted data, wherein the two voltage or current sampling terminals are operatively coupled to the first oscillating circuit.

40. The system of claim 30, wherein the magnetic flux concentrator is operative to provide the detected data to the first oscillating circuit.

41. The system of claim 30, wherein the first oscillating circuit includes at least a first planar inductance inscribed in a first surface area, and wherein the magnetic flux concentrator includes at least a second planar inductance inscribed in a second surface area, and wherein the first surface area is substantially smaller than the second surface area.

42. The system of claim 30, wherein the transponder includes at least a first planar inductance inscribed in a first surface area, and the magnetic flux concentrator includes at least a second planar inductance inscribed in a second surface area, and wherein the second surface area is substantially larger than the first surface area.

43. The system of claim 30, wherein the first oscillating circuit is adapted to receive an excitation signal having a first frequency, and has a first resonance frequency, and wherein the magnetic flux concentrator includes a second oscillating circuit having the first resonant frequency.

44. The system of claim 43, wherein the first resonant frequency is substantially equal to the first frequency.

45. The system of claim 30, wherein the first oscillating circuit is part of a read/write terminal operative to exchange information with the transponder.

* * * * *